United States Patent

Lange

[15] 3,635,268
[45] Jan. 18, 1972

[54] MULTIJOB ROUTER GUIDE KIT

[72] Inventor: Henry G. Lange, 1620 Bayview Ave., Bronx, N.Y. 10465

[22] Filed: Sept. 15, 1969

[21] Appl. No.: 858,086

[52] U.S. Cl.....................................144/134 D, 144/136 C
[51] Int. Cl..............................................B27c 5/10
[58] Field of Search...............144/136 C, 136, 134 D, 134, 144/144, 24; 90/13.5

[56] References Cited

UNITED STATES PATENTS 2,705,032  3/1955  Pearson.......................144/134 D
2,943,655  7/1960  Pedersen et al..................144/136 C

*Primary Examiner*—Donald R. Schran
*Attorney*—Carl Miller

[57] ABSTRACT

A router subbase attachment to the base of the router, the subbase having an annular attaching portion and a radial arm carrying a main guide track longitudinally adjustable thereon by means of plural bolt and slot connections. The main guide track is provided with pin receiving openings and may have detachably affixed thereto guide track extensions. A trammel pin unit embodying a pin and circular base can be employed wherein the base is adhesively secured to the surface of the workpiece thus precluding the need for driving a pin into the workpiece. Various types of contour guide elements may be attached to the outer end of the main guide track and the coupling connection consisting of interfitting coupling bar and dovetailed recess respectively at the forward end of the guide track extension and at the rear of the main guide track is such that the dovetailed recess may have positioned therein a contour guide element having a coupling head. In addition the base of the router which is annular is provided with a slot so that a trammel pin may be located between the circumferential confines of the base so as to enable to cutting of a small diameter circle.

1 Claims, 15 Drawing Figures

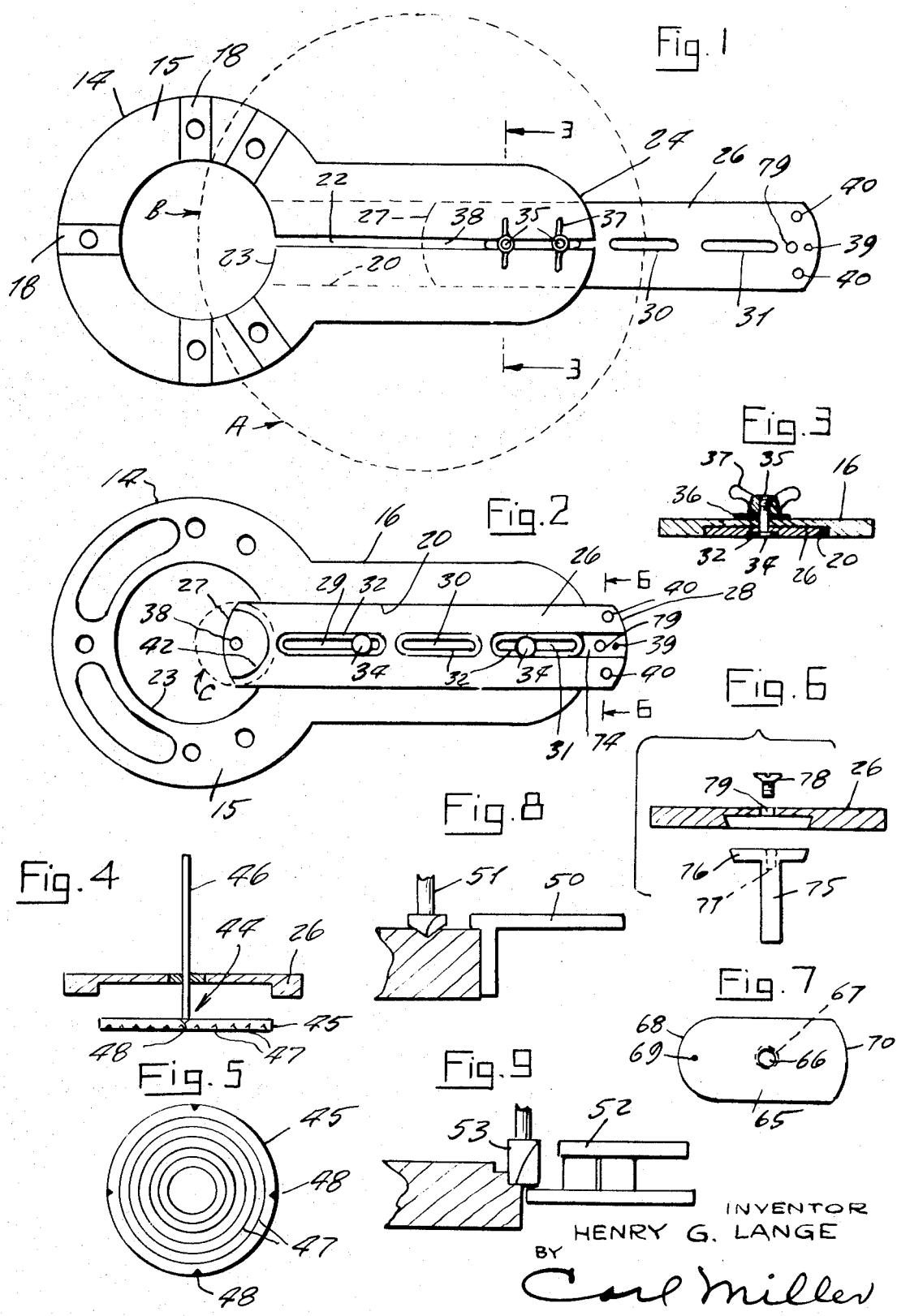

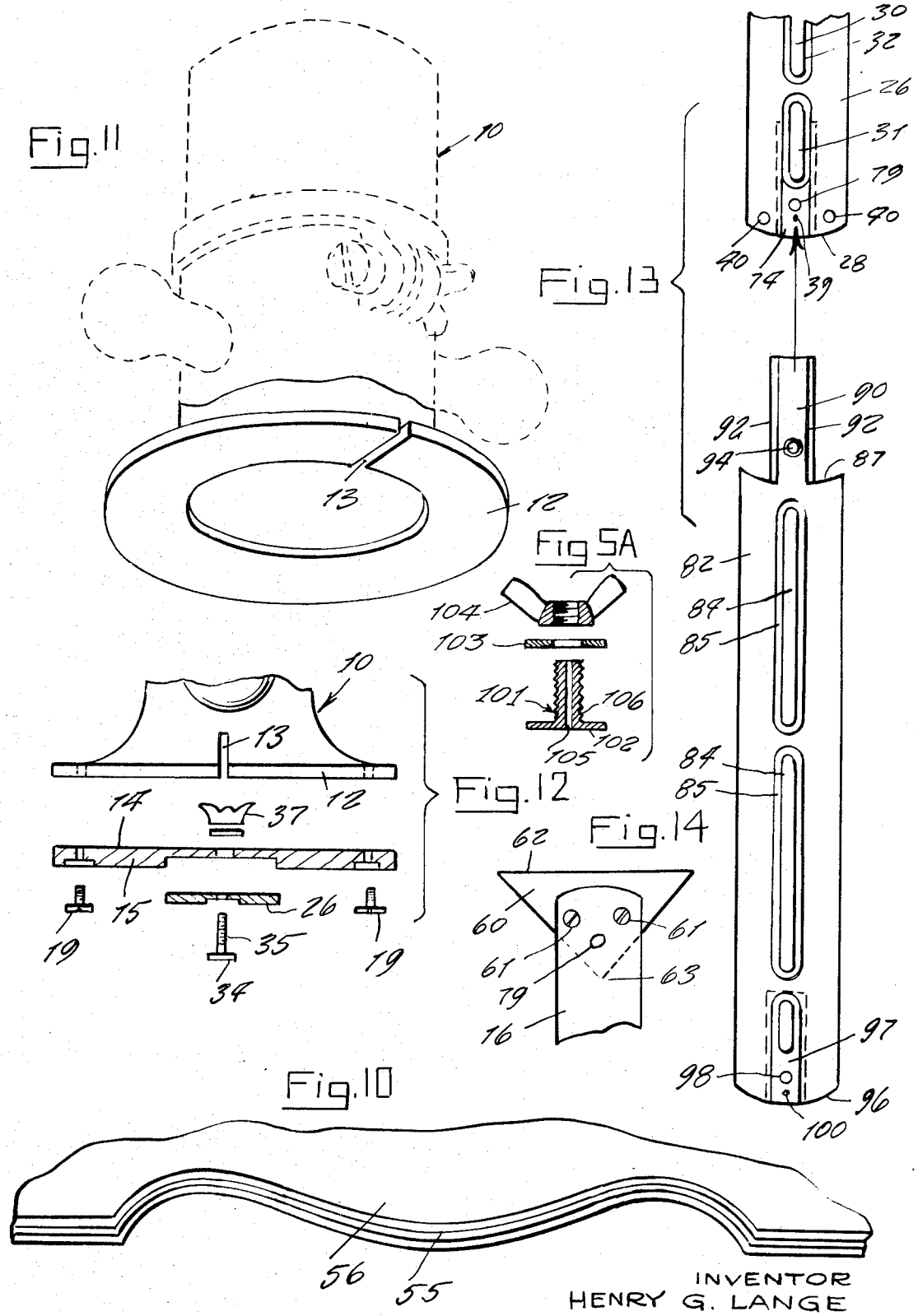

MULTIJOB ROUTER GUIDE KIT

This invention relates to router machines that are hand manipulated for making a variety of cuts in a wood workpiece and has for its primary object the provision of a subbase attachment detachably secured to the conventional annular base of the router machine adapted to carry a variety of elements detachably affixed thereto for making circle cuts from 1-inch diameter or less to several feet diameter, cutouts, contour cuts, round table tops, arches, rosettes, etc.

Another object of this invention relates to forming the subbase of an annular portion having an outwardly projecting flat radial arm which later is provided with a center longitudinal slot extending the complete length thereof and through the annular portion to the inner circumference thereof.

Still another object of this invention is to provide a slot in the base of the router machine which is annular in shape to permit the positioning of a trammel pin therein so as to enable the router to cut small diameter circles.

Yet another object of this invention is to provide on the upper side of the subbase annular portion slots and openings to accommodate adapter elements for mounting the subbase to router bases of varying sizes.

A further object of this invention is to provide on the underside of the subbase annular portion and radial arm a longitudinal rectangular recess in which is fitted a main guide track having spaced shouldered separate longitudinal slots for receiving one or more flat-headed bolts that seat in the shoulders of the separate slots and extend through the radial arm slot, the bolts having wing nuts thereon to clamp the main guide track in a selected position with relation to the radial arm.

A still further object of this invention is to provide trammel pin receiving openings at each end of the main guide track.

Yet another object of this invention is to provide a trammel pin unit having an upstanding pin integral with a circular base that is adapted to be adhesively secured to the surface of a workpiece.

Another object of this invention relates to providing a part circular recess in the underside of the forward end of the main guide track to accommodate the circular base of the trammel pin unit, the underside of the circular base, the main guide track, the annular portion of the subbase and its projecting arm all being coplanar.

Another of this invention is to provide at the outer end of the main guide track a plurality of openings to permit attachment to the main guide track any one of a variety of contour guide elements.

Still another object of this invention relates to the provision of a guide track extension to be detachably secured to the rear outer end of the main guide track by providing a dove-tailed recess in the main guide track on the underside of its rear outer end and a coupling bar on the forward end of the guide track extension of complemental shape such as to snugly fit within the dove-tailed recess with the forward end of the guide track extension abutting the rear end of the main guide track, and fastening means, extending through aligned openings for securing the coupling bar to the main guide track.

Yet another object of this invention is to provide in the guide track extension separate shouldered longitudinal slots similar to that in the main guide track as well as trammel pin receiving openings.

A further object of this invention is to provide at the rear end of the guide track extension a dove-tailed recess similar to that formed in the main guide track with like fastener receiving openings such that any desired number of guide track extensions may be coupled together for connection to the main guide track.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIG. 1 is a top plan view of the router subbase and integral arm with the main guide track shown in one adjusted position.

FIG. 2 is a bottom plan view of the router subbase and integral arm showing the main guide track in another adjusted position.

FIG. 3 is a cross-sectional view taken on line 3—3, FIG. 1.

FIG. 4 is a cross-sectional view of the adhesively secured trammel pin unit.

FIG. 5 is a bottom plan view of the circular base of the trammel pin unit of FIG. 4.

FIG. 5A shows a sectional view of the trammel pin insert for track extension also being used for circle cutting.

FIG. 6 is an exploded cross-sectional view taken on line 6—6, FIG. 2 showing the mounting of a contour guide element on the main guide track.

FIG. 7 is a plan view of a trammel pin insert.

FIG. 8 is a side view of one form of contour guide and router bit.

FIG. 9 is a side view of another form of contour guide and router bit.

FIG. 10 illustrates an example of a router cut on a workpiece.

FIG. 11 illustrates the lower portion of a router and its base.

FIG. 12 is an exploded view partly in cross section showing the attachment of the subbase to the router base.

FIG. 13 shows a plan view of a guide track extension and part of the main guide track with their associated connecting parts.

FIG. 14 shows the attachment of a contour guide element of wood secured to the end of the main guide track for guiding the router in making straight cuts or inside corner cuts.

Hand-held conventional router machines such as employed in woodworking are provided with a flat annular base to which is attached, to the underside thereof, a subbase which allows use of the router on fine finished surfaces without danger of mars or scratches. The conventional subbase is easily removed to clean the router, increase visibility or increase cutting-depth range. A conventional attachment device embodying parallel guide rods is also provided for use with the conventional router and is detachably mounted on the router base, the guide rods being adapted to carry a variety of guide elements and accompanying adjustments for the cutting of straight, curved and circular cuts. This invention dispenses with this form of guide rods and utilizes in lieu thereof a subbase having a radial arm which is adapted to carry one or more track elements to which later a variety of guide members may be mounted as will be hereinafter described.

Referring first to FIG. 11 there is shown a conventional form of router machine 10 having a flat horizontal annular base 12. The base 12 in accordance with the purposes of this invention is provided with a radial slot 13 for a purpose that will be hereinafter explained. For use with the base 12 there is provided a subbase 14, see FIG. 1, that may be made of aluminum or a suitable rigid plastic material.

The subbase 14 is formed with an annular portion 15 of a shape to conform to the dimensions of the annular base 12 of the router and is provided with a radial integral arm 16, both the annular portion 15 and the arm 16 being of the same thickness. The upper surface of the annular portion 15, see FIG. 1, is provided with a plurality of circumferentially spaced rectangular recesses or grooves 18 for the reception of special adapters (not shown) to secure the same to the base of different type routers should the use of such be necessary. The subbase 14 is detachably secured to the router base 12 by screws 19, see FIG. 12.

Provided in the subbase arm 16, on its underside, is a rectangular longitudinal guide recess 20 and a slot 22 in the longitudinal center of the arm, both the guide recess 20 and slot 22 extending the full length of the arm up to the inside periphery 23 of the annular portion 15. The terminal end of the arm 16 is preferably rounded as at 24. Slidable within the guide recess 20 is a main guide track 26 formed with rounded inner and outer ends 27, 28 respectively and a row of spaced longitudinal slots 29, 30 31; the slots lying in longitudinal registry with the slot 22 in the arm 16 as seen in FIGS. 1, 2 and 3. The slots 29, 30, 31 of main guide track 26 on their underside are recessed along their peripheral edges, see FIG. 2, as at 32, forming shoulders to accommodate a flat circular bolt head 34 of a bolt 35 that projects upwards through the track slots and the arm slot 22. A washer 36 and wing nut 37 is provided for each bolt so as to securely clamp the guide track 26 to the subbase arm 16. It is to be noted that in the top plan view, see FIG. 1, of the subbase 14, arm 16 and main guide track 26, that the track is positioned in the arm 16 so as to extend outwardly of the arm and that two bolts 35 are located in the slot opening 29 of the track for locking the same to the arm. In the bottom plan view, see FIG. 2, the main guide track 26 is positioned entirely within the arm recess 20 such that the inner end 27 thereof projects radially inwardly of the inner periphery 23 of the annular subbase 14 and with one bolt 35 in slot 29 and the other bolt 35 in the slot 31. These two showings of attachment of the guide track 26 to the arm 16 illustrate the manner of adjustment of the track with relation to the arm and the optional positioning of the attachment bolts 35. As seen in FIG. 3, the bottom surface of the bolthead 34 is flush with the bottom surface of the track 26 and arm 16, all lying in the same plane.

The main track guide 26 is provided adjacent each of its terminal ends with a pinhole opening, as at 38, 39, of at least 1/16-inch diamter, to receive a trammel pin (not shown) which is secured to the surface to be worked upon by the router. Also provided at the outer end of the guide track 26 is a plurality of openings 40 to which may be appropriately secured a straight edge and corner guide of wood, metal or other material. The underside of the main track guide 26 at its inner end is provided with a part circular recess 42 having its center at trammel pin receiving hole 38, for a purpose to be hereinafter described.

In the position of the guide track 26 in the arm 16 of the subbase 14 it is seen that the router may cut either a circular groove or a circular cutout as defined by the dotted line circle A. In this position the trammel pin (not shown) may be a "4d" nail with its head removed that extends through the inner trammel opening 38. The router bit (not shown) engages the work at point B which is the center of the annular subbase 15. Operation of the router machine 10 in the customary manner will effect the cutting of the circular groove ro circular cutout along circle A. It is apparent that adjustment of the guide track 26 in the arm 16 is easily and simply effected by loosening the wing nuts 37 and moving the track 26 in or out as desired or placing the bolts 35 in one or the other of slots 29, 30, 31. Circular cuts of greater diameter may be achieved by inserting the trammel pin through opening 39 at the outer end of the guide track.

In order to make it possible to cut circles within the range of the router base 12, see FIG. 11, the trammel pin (not shown) can extend through the slot 13 in the base 12. In the placement of the subbase 14 on the base 12 of the router, the slot 13 in base 12 is in alignment with the slot 22 in arm 16.

In lieu of a trammel pin that is driven into the surface of the work on which the router is to operate there may be utilized a trammel pin such as 44, see FIGS. 4 and 5, which is adhesively secured in any suitable manner to the surface of the work on which the router is to operate. The unit 44 consists of a circular baseplate 45 and a central upstanding vertical trammel pin 46 integral therewith. The bottom surface of the baseplate 45 is preferably provided with a series of concentric circular grooves 47 to receive the adhesive employed as well as to enhance the attachment adhesively of the baseplate to the surface of the work. Provided on the peripheral edge of the baseplate 45 at 90° spaced apart points are notches 48 which serve to accurately position the baseplate 45 on the work surface so as to register with like reference points marked off on said work surface to insure proper centering of the trammel pin 46. When the trammel pin unit 44 is employed the baseplate 45 fits into the part circular recess 42 at the inner end and on the underside of the guide track 26, see FIG. 2.

The small size of circle cut by the router bit with the trammel pin inwardly of the router base 12 is shown by the dotted circle C, FIG. 2.

Noncircular cuts of varying curvature, straight edge cuts and corner cuts may be made by the router by mounting on the track 16 appropriate contour guide elements. Examples of such contour guide elements are shown by contour guide element 50, see FIG. 8, for guiding router bit 51 to cut a V-shaped groove, and by a reversible contour guide element 52, see FIG. 9, for cutting a stepped edge by router bit 52. FIG. 10 illustrates one example of a curved grooved or stepped edge 55 on a wood panel 56 cut by a router bit guided by an appropriate contour guide element mounted either on the subbase arm 16 or guide track 26.

FIG. 14 illustrates a wooden straight edge and corner guide element 60 attached by screws 61 to the element end of guide track 16. Edge 62 of guide element 60 is utilized for straight cuts and corner edge 63 is utilized for inside corner cuts.

In certain instances it may be desirable to mount in recess 20 of the arm 16 of the subbase 14 in place of the guide track 26 a trammel pin insert of short length such as 65, see FIG. 7. This is a short plate dimensioned to slidably fit in recess 20 and to have its underside flush with the under surface of the arm 16. The insert plate is provided with a central bolt receiving opening 66 the underside of which is recessed as at 67 to accommodate the flat head 34 of bolt 35. The front end of the insert plate 65 is rounded as at 68 and spaced on the longitudinal center of the insert plate inwardly from the rounded end is a trammel pin hole 69. The opposite end of the insert plate 65 is also rounded as at 70.

On the underside of main guide track 26, at its rear end portion, there is provided a dove-tailed recess 74 that extends forwardly about midway of rear slot 31 with its bottom at least level with recess of shoulder 32. This dove-tailed recess 74 is adapted for a variety of purposes and is designed to have fitted therein a contour guide element such as 75, see FIG. 6, having a flat head 76 with inclined sides complemental to the dove-tailed recess 74 so as to slidably fit therein. A threaded opening 77 is provided in the guide element head 76 to receive screw 78 inserted either through slot 31 or opening 79, for securing the guide element 75 in position.

The dove-tailed recess 74 may also receive a trammel pin insert (not shown) having a base shaped complemental to the recess 74 comparable to guide element head 76 and which may be secured in a like manner to guide track 26 by screw 78.

In some instances it may be desirable to extend the main guide track 26. In this case there is provided a guide track exterior 82, see FIG. 13, provided with one or more longitudinal recessed slots 84, 85 such as 31, 32, see FIG. 2. The forward end of the track extension 82 is made concave as at 87 and complemental to the rounded outer end 28 of main guide track 26, and integral with track extension 82 is a longitudinal forwardly extending coupler bar 90 having inclined side edges 92 and complemental to the dove-tailed recess 74 such as to snugly fit wholly therewithin with the forward concave edge 87 abutting the rounded end 28 of the guide track. A tapped opening is provided in the coupling bar 90 to register with opening 79 in the guide track for the reception of a fastening screw, such as 78, FIG. 6. A series of like guide track extensions 82 may be connected together it being noted that the rear end of the guide track extension is rounded as at 96 similar to rounded end 28 of main guide track 26 and is provided with a dove-tailed longitudinal recess 97 similar to dove-tailed recess 74 in the main guide track 26. Located in recess 97 is a fastener receiving opening 98 similar to opening 79 in the recess 74 of the main guide track 26. Rearwardly of opening 98 there is provided a trammel pin opening 100.

The invention as above described totally eliminates the conventional parallel bar slot and circle cutting attachment which have the disadvantage of being bent and marred by the use of thus making it difficult to make quick and effortless adjustment. The subbase and arm, and adjustable main track thereon takes over the function of the parallel bar conventional slot and circle cutting attachment, by making more effective due to its simplicity and ease of adjustment the use and operation of the router. In addition a variety of parts as explained above such as trammel point inserts, contour guides, etc., can be attached to the main guide track. Using 4d nail or other adhesive trammel pin insert offers a troublefree and precise router operation, and the adhesive trammel pin insert leaves no pinhole in the workpiece. Circular grooves or circular cutouts of all sizes, from 1 inch to several feet in diamter, can be cut with the instant invention attachment.

FIG. 5A shows another circle cutting element 101 with a flat-headed bolt 102 with washer 103 and wingnut 104, provided with a 1/16-inch trammel pin-receiving opening 105, running lengthwise through the center of the bolt 106.

This bolt 106 can be conveniently placed in any of the slots 29, 30, 31 and 84 of he guide track 26 or guide track extension 82.

I claim:

1. A guide structure attachment for a router having a lower flat annular base, comprising:
   a. a subbase detachably secured to the router base,
   b. an integral radial arm extending outwardly from said subbase,
   c. a main guide track movable supported on said radial arm to selected positions thereon.
   d. fastener means for securing said guide track in its selected position directly to said radial arm, and
   e. at least one trammel pin opening provided on said guide track, wherein:

f. said subbase includes a flat annular portion abutting the underside of the router base to which it is detachably secured,
   g. said radial arm being coplanar with said annular portion and integral therewith, and
   h. both said annular portion and said radial arm being of uniform thickness with the upper and lower sides thereof lying in parallel planes,
   i. a longitudinal rectangular recess in the underside of the radial arm extending from the inside periphery of the annular portion to the outer terminal end of said radial arm,
   j. a longitudinal radial slot extending centrally of the rectangular recess from the bottom thereof through the upper side of the radial arm and corresponding in length to the length of said recess, and
   k. said guide track being dimensioned for slidable tracking longitudinal movement in said recess with the underside of the guide track coplanar with the lower side of the radial arm.

* * * * *